April 20, 1926.
R. B. FAGEOL
AUTOMOBILE END FENDER
Filed Feb. 18, 1925
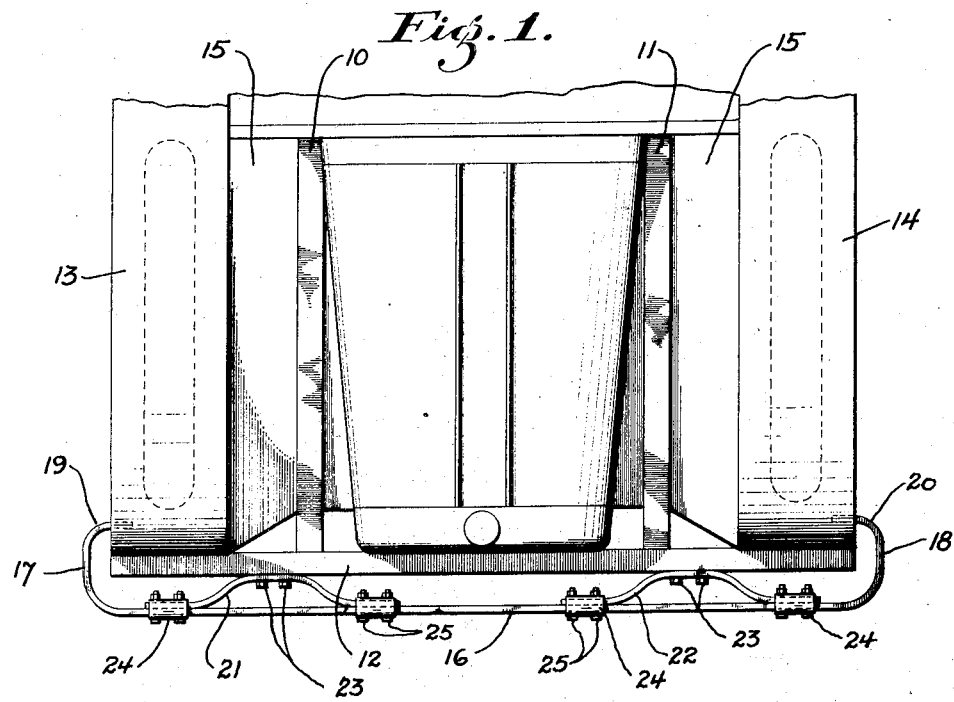
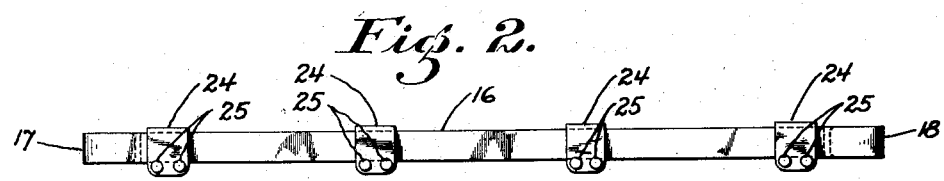
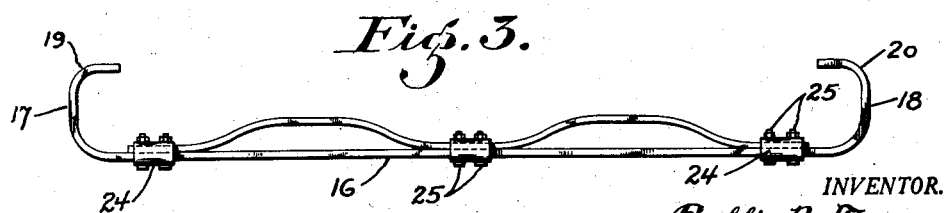
INVENTOR.
Rollie B. Fageol.
BY
Dewey, Strong, Townsend & Loftus
ATTORNEYS.

Patented Apr. 20, 1926.

1,581,432

UNITED STATES PATENT OFFICE.

ROLLIE B. FAGEOL, OF LOS ANGELES, CALIFORNIA, ASSIGNOR TO AMERICAN CHAIN COMPANY, INC., OF BRIDGEPORT, CONNECTICUT, A CORPORATION OF NEW YORK.

AUTOMOBILE END FENDER.

Application filed February 18, 1925. Serial No. 9,981.

*To all whom it may concern:*

Be it known that I, ROLLIE B. FAGEOL, a citizen of the United States, residing at Los Angeles, county of Los Angeles, and State of California, have invented new and useful Improvements in Automobile End Fenders, of which the following is a specification.

This invention relates to a protecting device for automobiles and particularly pertains to an end fender therefor.

The principal object of the present invention is to provide a device for protecting the end of an automobile and the side fenders thereof.

The principal object of the present invention is to provide a device for protecting the end of an automobile and the side fenders thereof, especially on trucks and passenger buses, by means which will effectually resist excessive impact caused by collision and will prevent the distortion of the automobile frame.

The present invention contemplates a rigid transverse frame member secured across the end of an automobile frame and serving as a support for a resiliently mounted and horizontally disposed bumper bar terminating in recurved portions extending alongside and hooking around the sides of the automobile side fenders.

The invention is illustrated by way of example in the accompanying drawings, in which:

Fig. 1 is a fragmentary view of a preferred form of the present invention showing it as applied to the forward end of an automobile.

Fig. 2 is a view in front elevation showing the complete fender with which the present invention is concerned.

Fig. 3 is a view in plan showing another form of the present invention.

Referring more particularly to the drawing, 10 and 11 indicate the side frame members of an automobile main frame, while 12 indicates a transverse frame member suitably secured in a rigid manner across the ends of the side rails 10 and 11. It is common practice to construct the members 10, 11 and 12 from material of channel section. Mounted upon opposite sides of the frame formed by side rails 10 and 11 are side wheel fenders 13 and 14. These fenders are of the usual formation, being substantially semicircular when considered in side elevation and being connected to the side rails of the frame by aprons 15.

Particularly in the cases of heavy motor vehicles and passenger buses, it is desirable to provide adequate means for protecting the frame from being sprung under impact in traffic and also to prevent crushing of the fenders. With that idea in view the transverse frame member 12 has been extended completely across the end of the vehicle and across the ends of the side fenders 13 and 14, these ends of the side fenders being here shown as fastened thereto.

In order to deaden the shock of impact which might be otherwise transmitted to the frame of the vehicle or to the fenders, a resilient bumper structure is carried by the transverse fender member. This structure comprises a horizontally extending impact bar 16 parallel to the transverse frame member 12 and spaced a distance therefrom. The ends of this bar curve rearwardly to form side portions 17 and 18. The side portion 17 is spaced a distance from the end of the end frame member 12 and terminates in an end curled around the side fender 13 as indicated at 19. The end portion 18 extends along the outer face of the opposite fender 14 and terminates in a curved end extending around the edge of side fender 14 as indicated at 20. It is to be understood that the entire bumper bar 16 is formed of resilient material such as flat stock spring steel. The bumper bar 16 is mounted in its position parallel to the cross frame member 12 on semi-elliptical spring members 21 and 22. These members are secured to the forward face of the cross frame member 12 at points near their centers by bolts 23. Their opposite ends flare outwardly and to the sides of their point of mounting on the cross frame member 12 and terminate in end portions lying flat against the back face of the bumper bar 16.

These ends are each fastened in position by a clevis 24 embracing the bumper bar and the end, the clevis being in turn clamped by bolts 25. It is to be understood that while the clevis clamps the bumper bar to the mounting members 21 and 22, yet under excessive impact the bars and members 21 and 22 may have slight relative movement to each other allowing the full resiliency of the bar and the full resiliency of the spring mountings 21 and 22 to become effected. In any event, blows delivered to the corners of the frame either obliquely from the front or rear or directly from the side will be resisted by the curved end portions of the bumper, and the fender frame will thus be afforded additional protection.

While I have shown the preferred form of my invention as now known to me, it is to be understood that various changes may be made in its construction without departing from the spirit of the invention as defined in the claims.

Having thus described my invention, what I claim and desire to secure by Letters Patent is:

1. In combination with an automobile frame and its side fenders, an end fender construction comprising a horizontally disposed bumper bar extending transversely of the automobile frame and terminating in ends which curve around and hook over the edge of the automobile fenders, and in spaced relation thereto and resilient means for holding said bumper in its transverse position relative to the automobile frame.

2. In combination with an automobile frame and its side fenders, a rigid cross frame member secured transversely of the end of said automobile frame and overhanging the ends of the side fenders which are fastened thereto, a bumper bar formed of resilient material and disposed parallel to and in substantially the same horizontal plane with said transverse frame member, and resilient means for supporting said bumper bar in its parallel position.

3. In combination with an automobile frame and its side fenders, a rigid cross frame member secured transversely of the end of said automobile frame and overhanging the ends of the side fenders which are fastened thereto, a bumper bar formed of resilient material and disposed parallel to and in substantially the same horizontal plane with said transverse frame member, said bumper bar terminating in ends curling around the ends of the transverse frame member and the outer sides of the fenders attached thereto, and resilient means for supporting said bumper bar in its parallel position.

ROLLIE B. FAGEOL